US012616161B2

(12) United States Patent
       Gross

(10) Patent No.: US 12,616,161 B2
(45) Date of Patent: May 5, 2026

(54) LIVESTOCK RESTRAINING DEVICES, SYSTEMS FOR LIVESTOCK MANAGEMENT, AND USES THEREOF

(71) Applicant: CO-EXIST LTD, Avni Eitan (IL)

(72) Inventor: Yehonatan Gross, Ein-Gev (IL)

(73) Assignee: CO-EXIST LTD, Avni Eitan (IL)

( * ) Notice: Subject to any disclaimer, the term of this patent is extended or adjusted under 35 U.S.C. 154(b) by 219 days.

(21) Appl. No.: 18/010,726

(22) PCT Filed: Jun. 15, 2021

(86) PCT No.: PCT/IL2021/050723
       § 371 (c)(1),
       (2) Date: Dec. 15, 2022

(87) PCT Pub. No.: WO2021/255731
       PCT Pub. Date: Dec. 23, 2021

(65) Prior Publication Data
       US 2023/0263124 A1      Aug. 24, 2023

Related U.S. Application Data

(60) Provisional application No. 63/039,248, filed on Jun. 15, 2020, provisional application No. 63/039,263, filed on Jun. 15, 2020.

(51) Int. Cl.
       *A01K 5/00*        (2006.01)
       *A01K 1/00*        (2006.01)
       *A01K 5/01*        (2006.01)
       *A01K 11/00*       (2006.01)

(52) U.S. Cl.
       CPC .............. *A01K 1/0017* (2013.01); *A01K 5/01* (2013.01); *A01K 11/006* (2013.01)

(58) Field of Classification Search
       CPC ................................................... A01K 11/006
       See application file for complete search history.

(56) References Cited

U.S. PATENT DOCUMENTS

| 7,270,078 | B2 * | 9/2007 | Van Den Berg ......... A01K 1/12 |
| | | | 119/14.04 |
| 10,085,419 | B2 | 10/2018 | Zimmerman et al. |
| 2006/0112890 | A1 | 6/2006 | Den Berg et al. |
| 2017/0013802 | A1 * | 1/2017 | Zimmerman ............ A01K 5/01 |
| 2018/0235174 | A1 * | 8/2018 | Van Den Berg ......... A01K 1/12 |
| 2018/0235176 | A1 | 8/2018 | Van Den Berg et al. |
| 2019/0090451 | A1 * | 3/2019 | Pinsky ..................... A01K 1/12 |

(Continued)

FOREIGN PATENT DOCUMENTS

| EP | 1523882 | A2 | 4/2005 |
| WO | 2013122468 | A1 | 8/2013 |
| WO | 2020129056 | A1 | 6/2020 |

OTHER PUBLICATIONS

Extended European Search Report for Application No. 21826628.6, dated Oct. 10, 2023, 9 pages.

(Continued)

*Primary Examiner* — Joshua J Michener
*Assistant Examiner* — Henry Hooper Mudd
(74) *Attorney, Agent, or Firm* — Meitar Patents LTD.; Daniel Kligler

(57) ABSTRACT

Tools for smart farming, including devices, management systems and methods of livestock management are provided.

17 Claims, 15 Drawing Sheets

(56) References Cited

U.S. PATENT DOCUMENTS

| | | | |
|---|---|---|---|
| 2019/0343069 A1* | 11/2019 | Janisiow | A01K 1/10 |
| 2022/0061260 A1* | 3/2022 | Gross | A01K 1/00 |
| 2023/0389535 A1* | 12/2023 | Jordan | A01M 23/02 |

OTHER PUBLICATIONS

International Search Report and Written Opinion for Application No. PCT/IL2021/050723, dated Aug. 25, 2021, 12 pages.
International Preliminary Report on Patentability for Application No. PCT/IL2021/050723, dated Dec. 13, 2022, 8 pages.

* cited by examiner

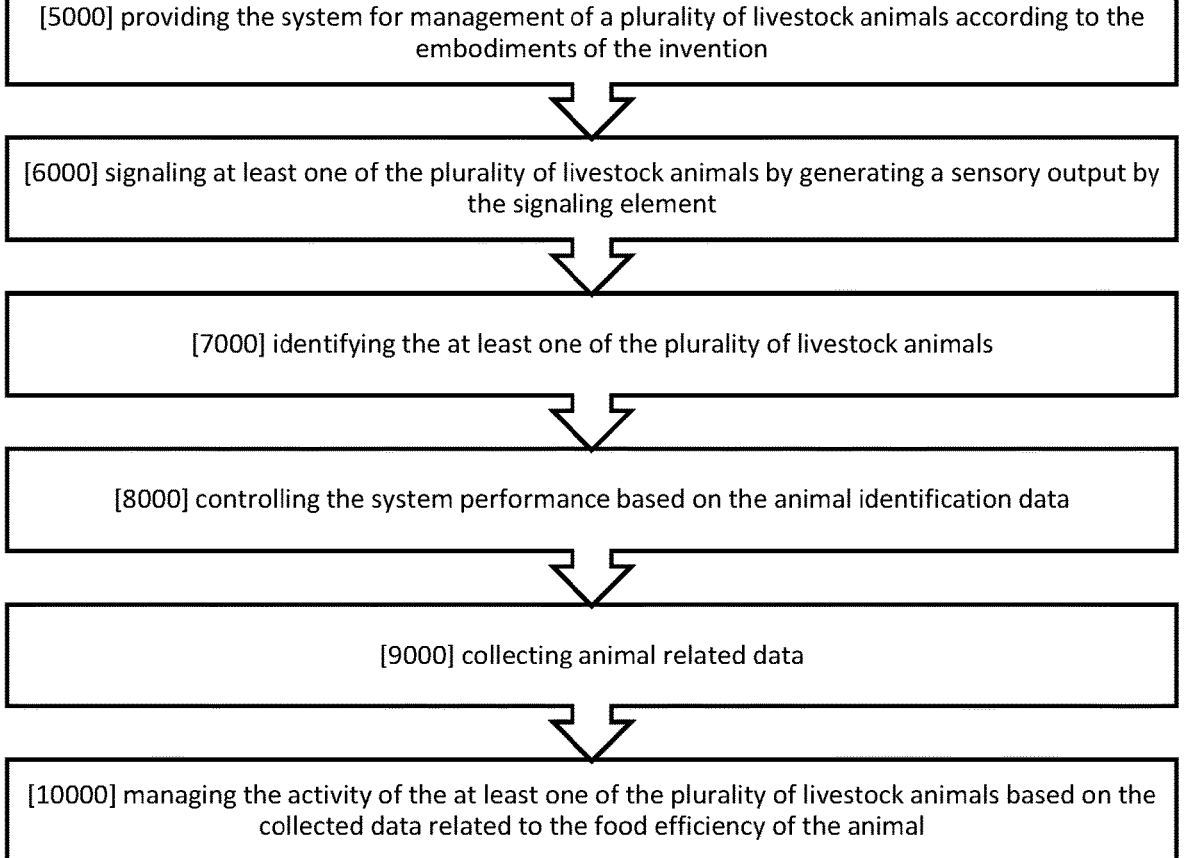

[5000] providing the system for management of a plurality of livestock animals according to the embodiments of the invention

[6000] signaling at least one of the plurality of livestock animals by generating a sensory output by the signaling element

[7000] identifying the at least one of the plurality of livestock animals

[8000] controlling the system performance based on the animal identification data

[9000] collecting animal related data

[10000] managing the activity of the at least one of the plurality of livestock animals based on the collected data related to the food efficiency of the animal

Figure 5

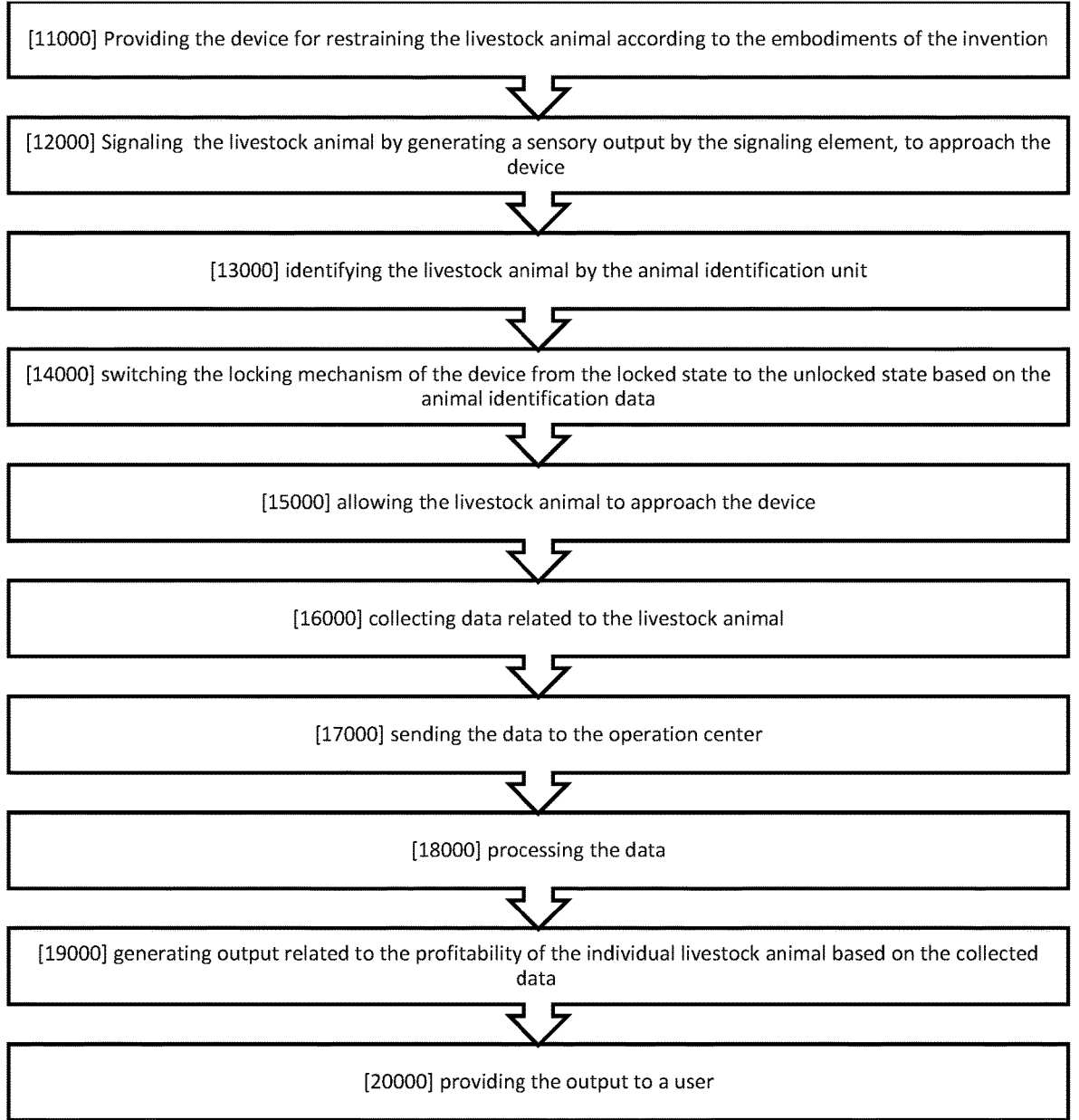

[11000] Providing the device for restraining the livestock animal according to the embodiments of the invention

[12000] Signaling the livestock animal by generating a sensory output by the signaling element, to approach the device

[13000] identifying the livestock animal by the animal identification unit

[14000] switching the locking mechanism of the device from the locked state to the unlocked state based on the animal identification data

[15000] allowing the livestock animal to approach the device

[16000] collecting data related to the livestock animal

[17000] sending the data to the operation center

[18000] processing the data

[19000] generating output related to the profitability of the individual livestock animal based on the collected data

[20000] providing the output to a user

Figure 6

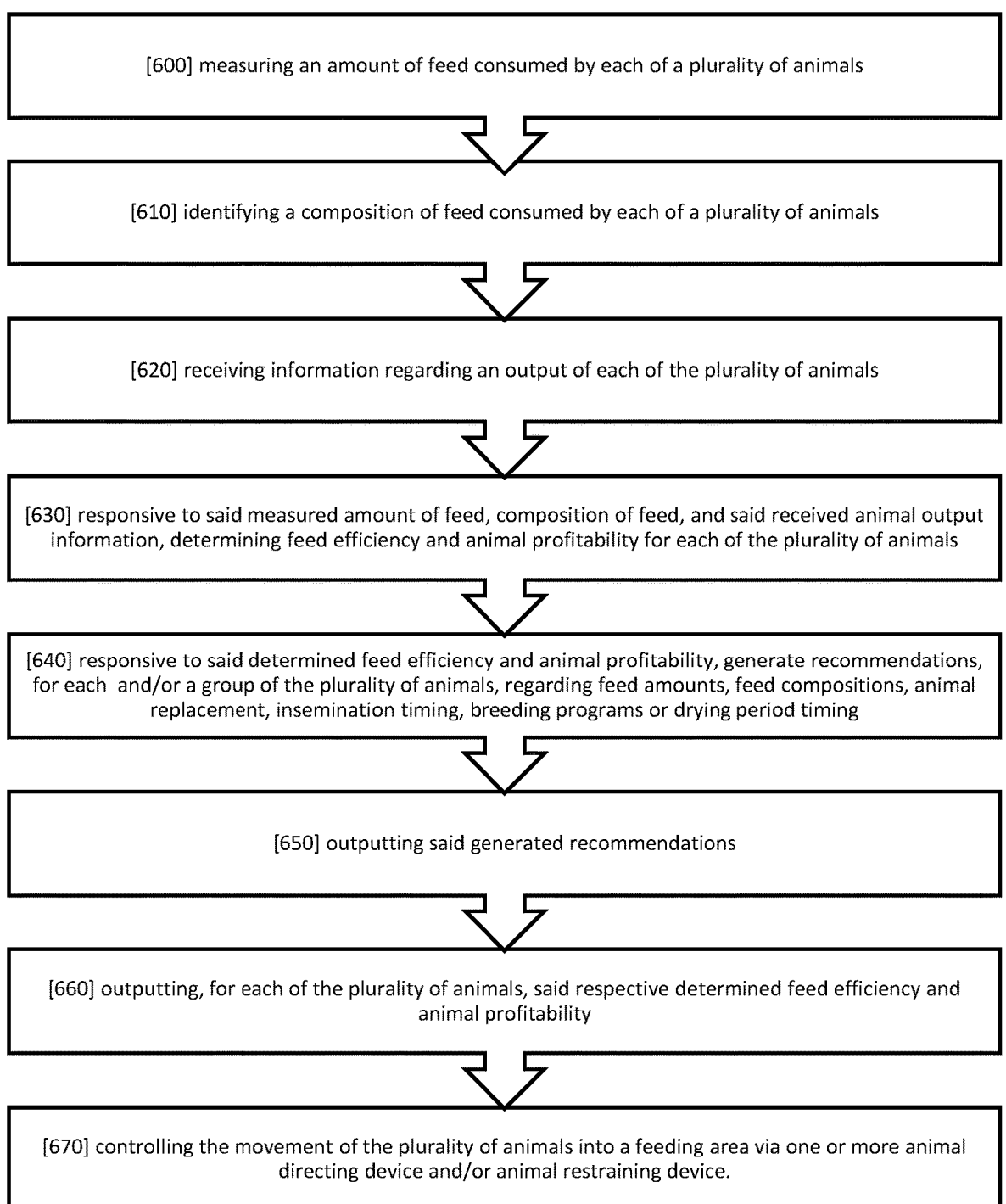

[600] measuring an amount of feed consumed by each of a plurality of animals

[610] identifying a composition of feed consumed by each of a plurality of animals

[620] receiving information regarding an output of each of the plurality of animals

[630] responsive to said measured amount of feed, composition of feed, and said received animal output information, determining feed efficiency and animal profitability for each of the plurality of animals

[640] responsive to said determined feed efficiency and animal profitability, generate recommendations, for each and/or a group of the plurality of animals, regarding feed amounts, feed compositions, animal replacement, insemination timing, breeding programs or drying period timing

[650] outputting said generated recommendations

[660] outputting, for each of the plurality of animals, said respective determined feed efficiency and animal profitability

[670] controlling the movement of the plurality of animals into a feeding area via one or more animal directing device and/or animal restraining device.

Figure 9

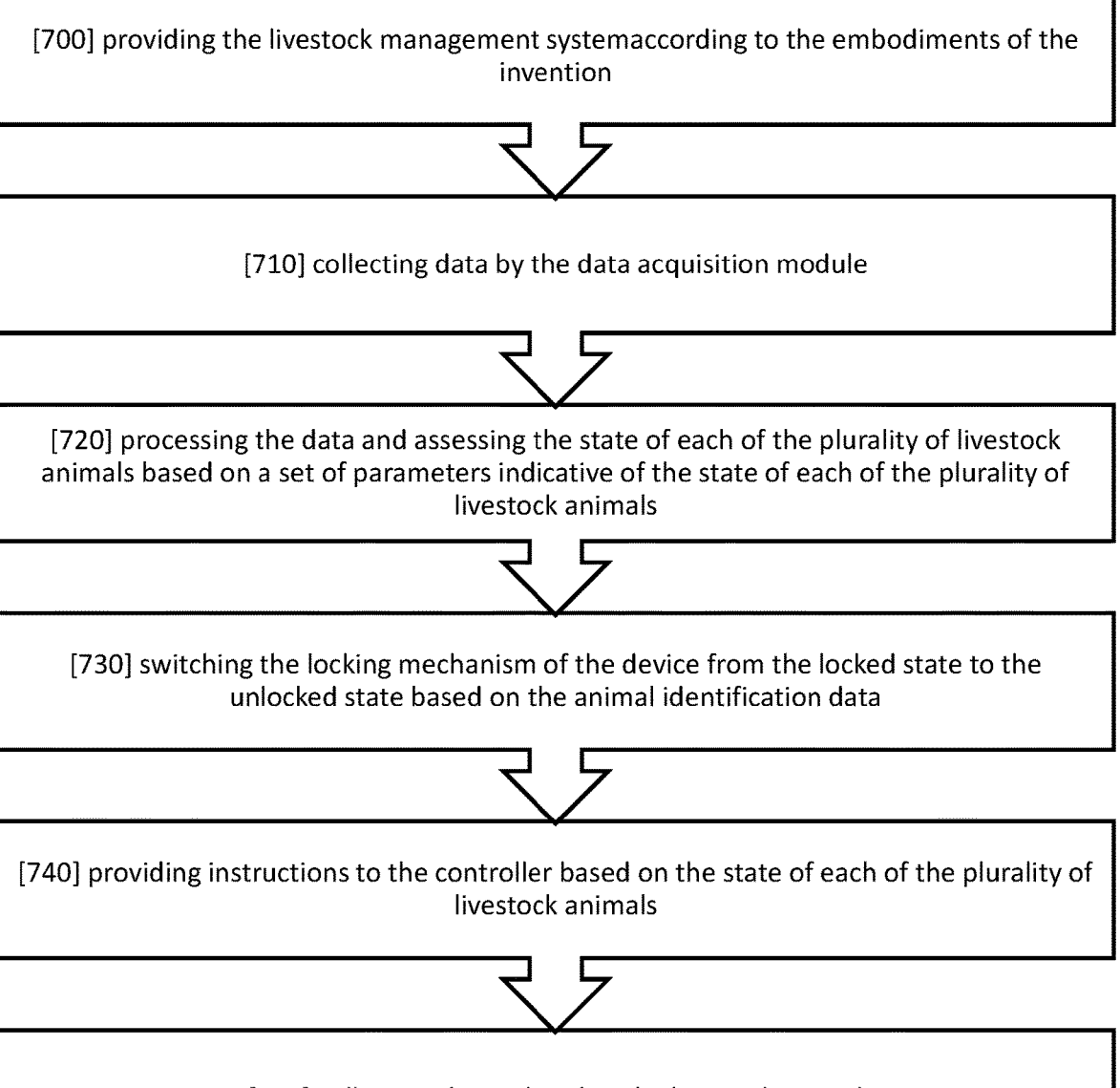

[700] providing the livestock management systemaccording to the embodiments of the invention

[710] collecting data by the data acquisition module

[720] processing the data and assessing the state of each of the plurality of livestock animals based on a set of parameters indicative of the state of each of the plurality of livestock animals

[730] switching the locking mechanism of the device from the locked state to the unlocked state based on the animal identification data

[740] providing instructions to the controller based on the state of each of the plurality of livestock animals

[750] collecting data related to the livestock animal

Figure 10

LIVESTOCK RESTRAINING DEVICES, SYSTEMS FOR LIVESTOCK MANAGEMENT, AND USES THEREOF

CROSS-REFERENCE TO RELATED APPLICATIONS

This application is the U.S. national phase of PCT Application No. PCT/IL2021/050723 filed on Jun. 15, 2021, which claims the benefit of U.S. provisional application Ser. No. 63/039,248 filed Jun. 15, 2020 and U.S. provisional application Ser. No. 63/039,263 filed Jun. 15, 2020, the disclosures of which are hereby incorporated in their entirety by reference herein.

TECHNICAL FIELD OF THE INVENTION

The present invention generally relates to tools for smart farming. Specifically, the invention relates to smart head-locks for livestock animals.

BACKGROUND OF THE INVENTION

Modern days livestock farming requires managing large groups of animals, monitoring each animal, monitoring the herd, groups of animals within the herd, the conditions in the farm and the like.

Head locks are devices that are installed in front of a trough or rack, and which are intended to limit the movements of animals when they are eating. These devices allow animals to be separated, save food, and help maintain tranquility in the herd.

In general, conventional feeders comprise a plurality of individual stations arranged in series, each presenting a space through which the animal must pass its head to access the food, said space being delimited laterally by a vertical straight bar, and by a bent bar mounted so as to be able to pivot in a vertical plane between a passage position and a retaining position, a restraining device being also associated with each bent bar to allow automatic locking of said bent bar after tilting of the latter in its retaining position.

While the field of smart farming develops, no significant technological breakthrough was made so far with livestock restraining system. It is thus crucial to develop user friendly, cost effective, headlock systems as an important tool in precision farming.

BRIEF DESCRIPTION OF THE DRAWINGS

FIG. 5 is a flowchart illustrating an exemplary embodiment of the method of managing livestock according to the embodiments of the invention;

FIG. 6 is a flowchart illustrating an exemplary embodiment of the method of controlling profitability according to the embodiments of the invention;

FIG. 9 is a high-level flowchart illustrating an exemplary embodiment of a method of livestock management of the invention; and, FIG. 10 is a high-level flowchart illustrating an exemplary embodiment of a computer implemented method of managing a plurality of livestock animals of the invention.

Figure 1:
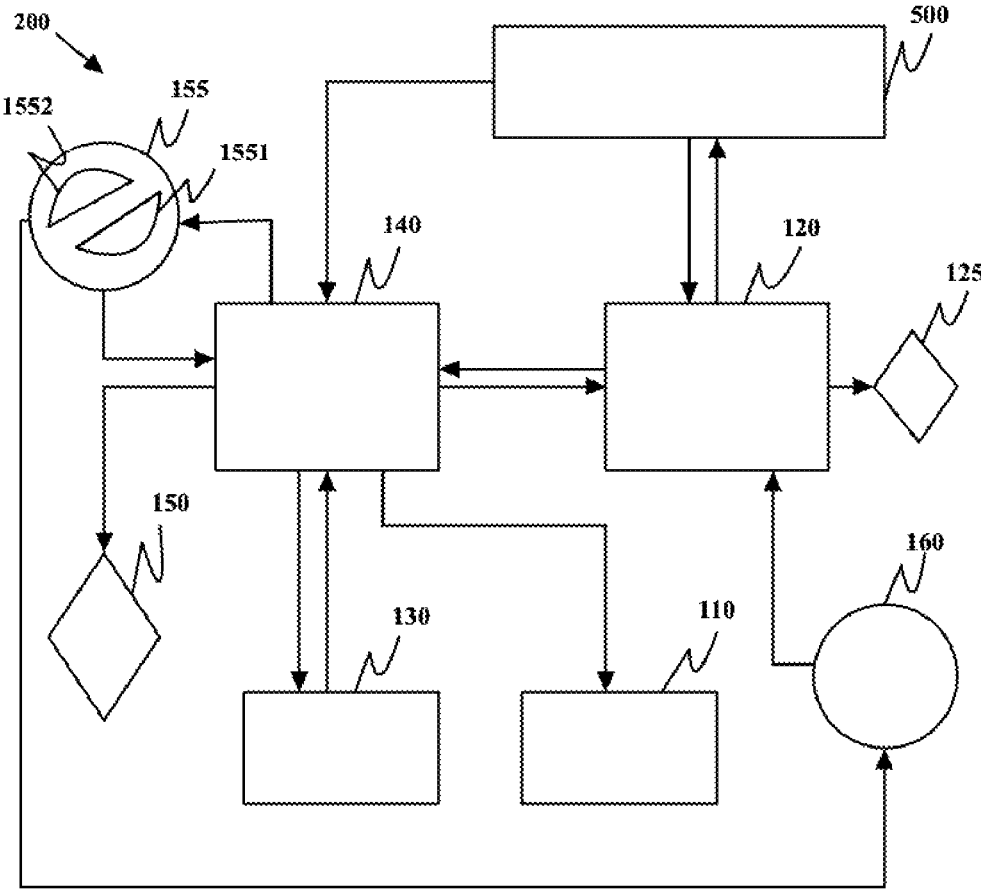
FIG. 1 is a high-level block diagram illustrating an exemplary embodiment of the restraining device according to the embodiments of the invention.
Figure 2A:
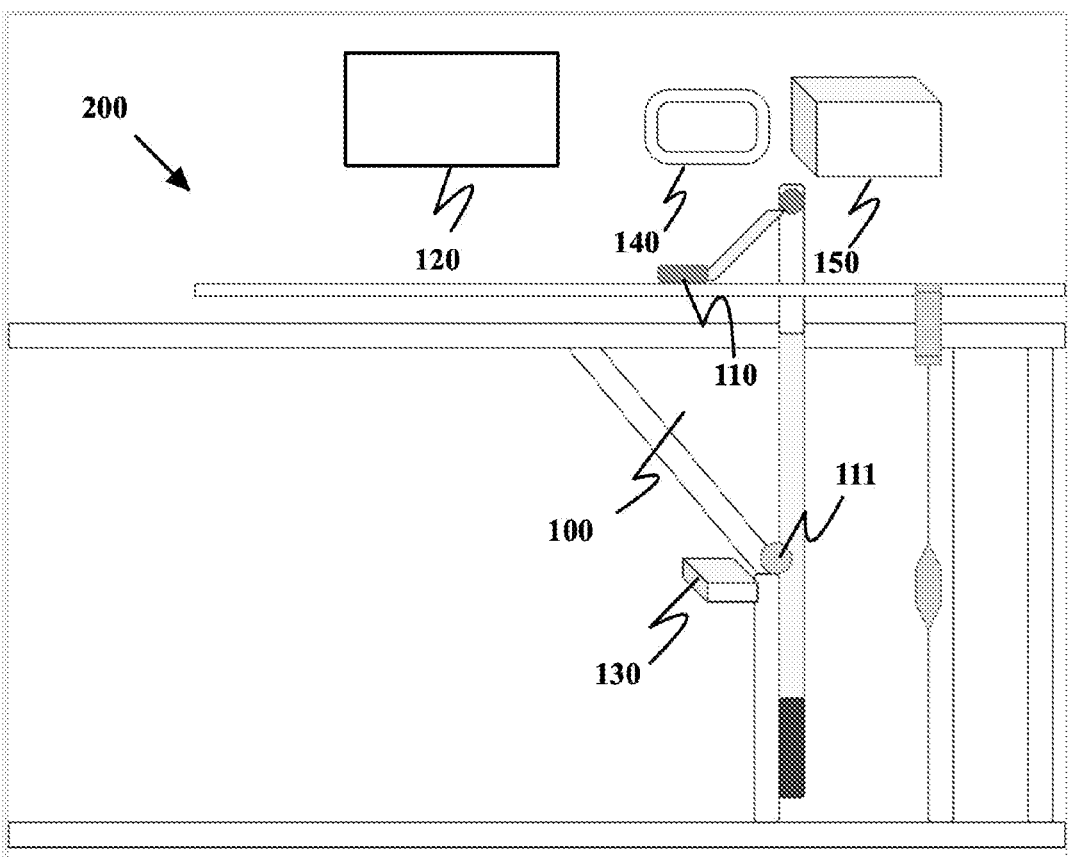
FIG. 2A-F is an illustration, depicting an exemplary embodiment of a restraining device of the invention in closed and open configuration.
Figure 2B:
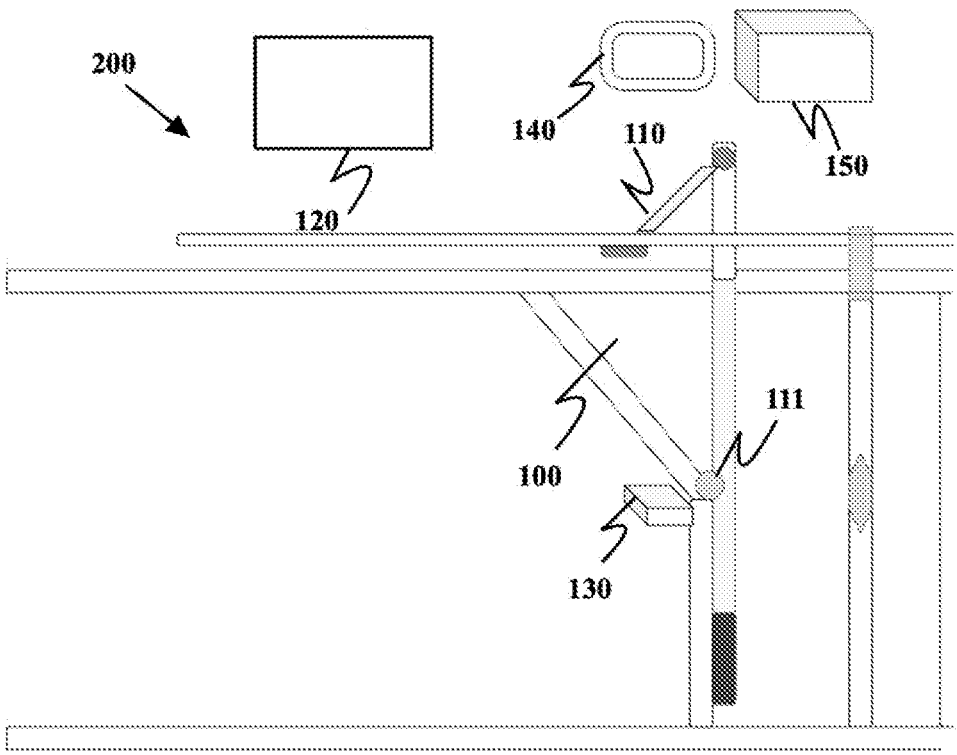
Figure 2C:
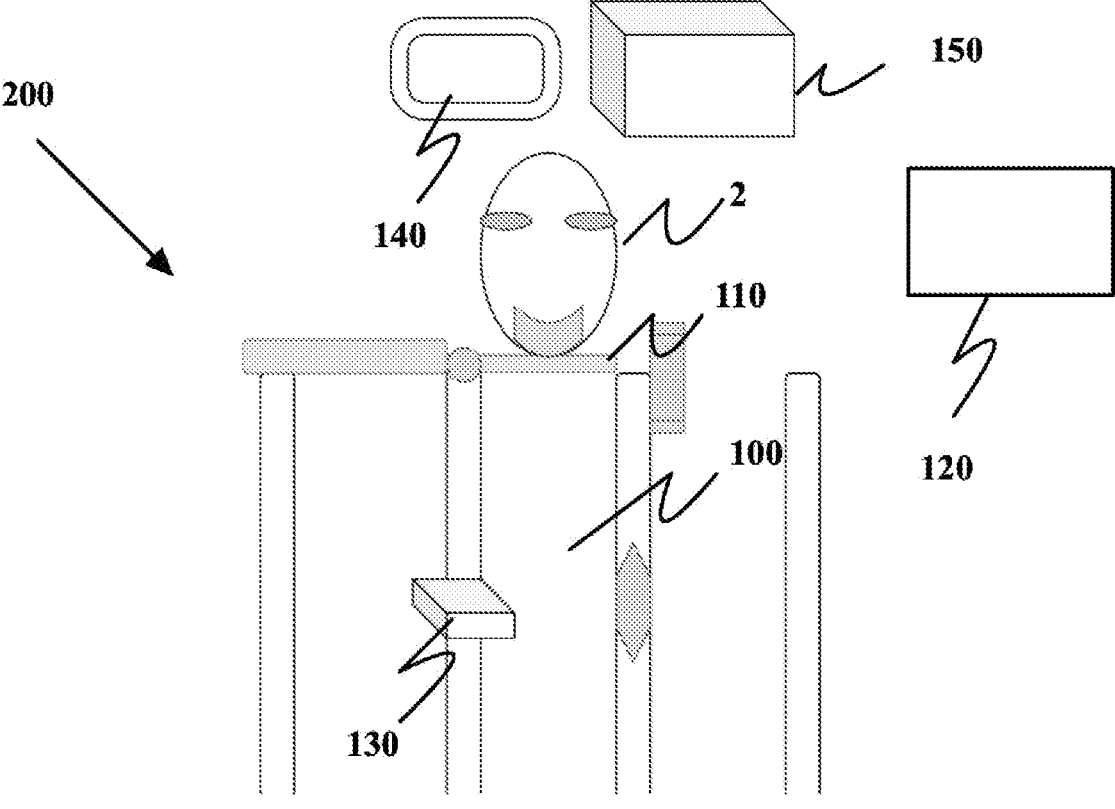
Figure 2D:
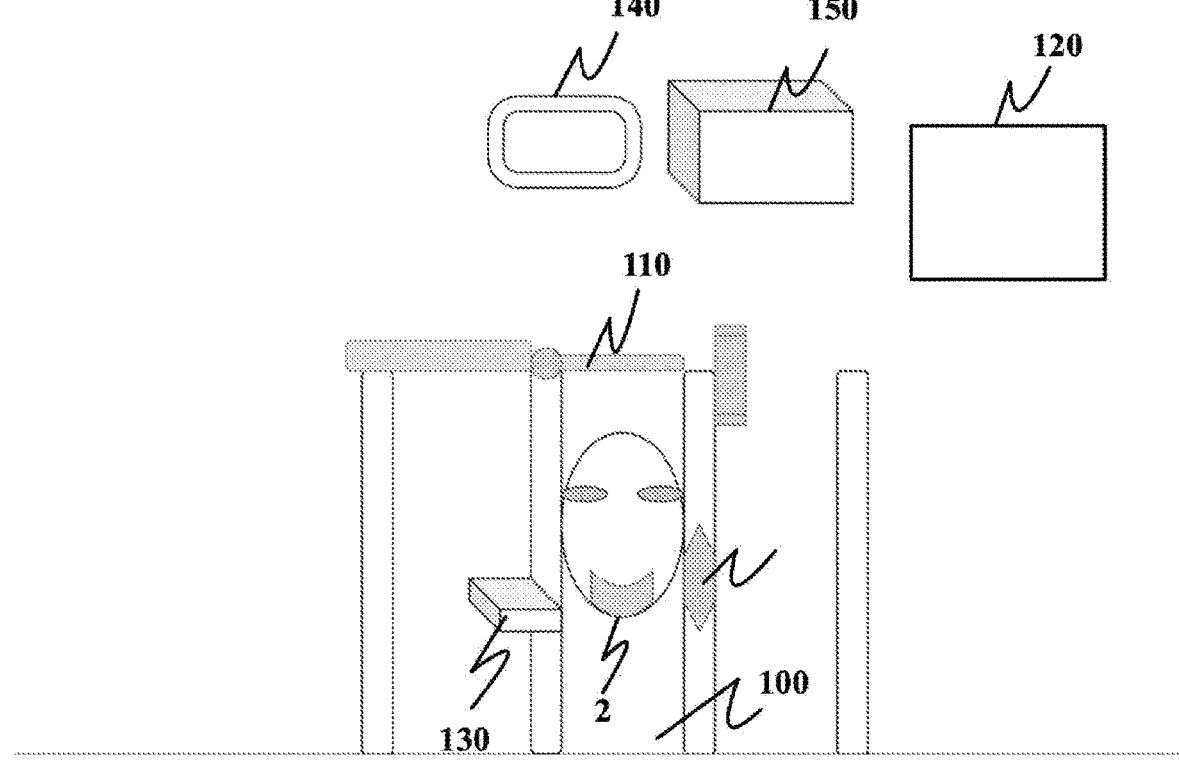
Figure 2E:
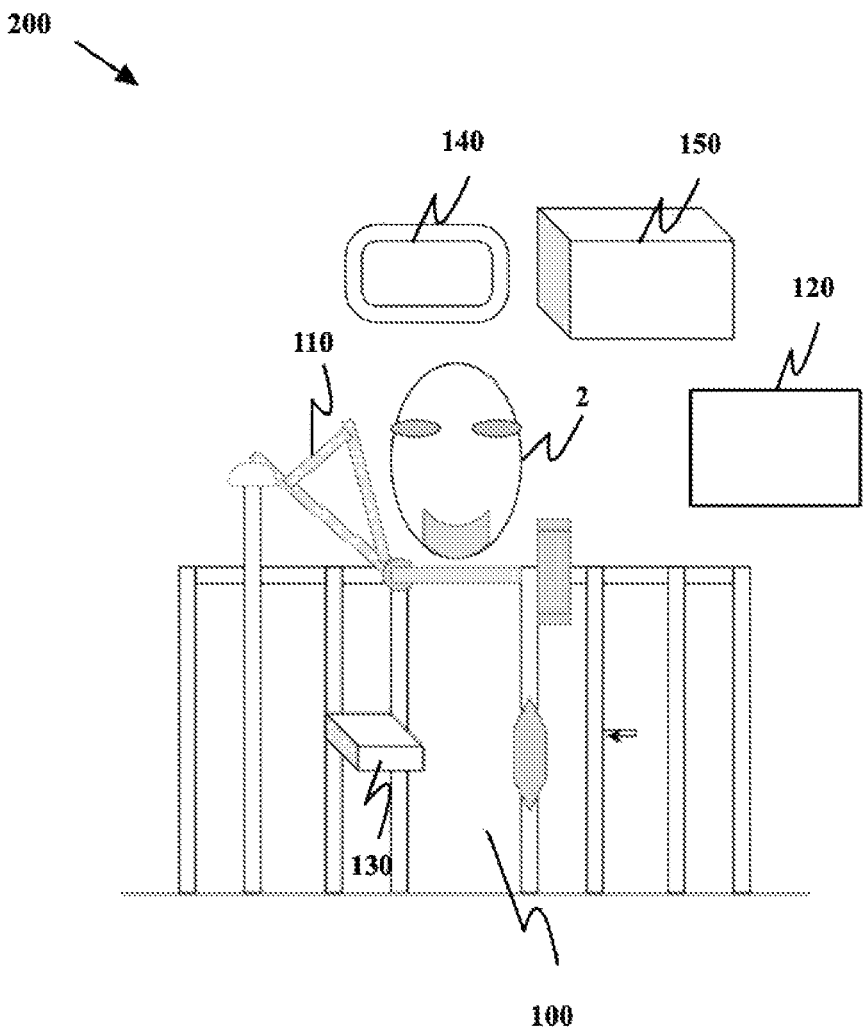
Figure 2F:
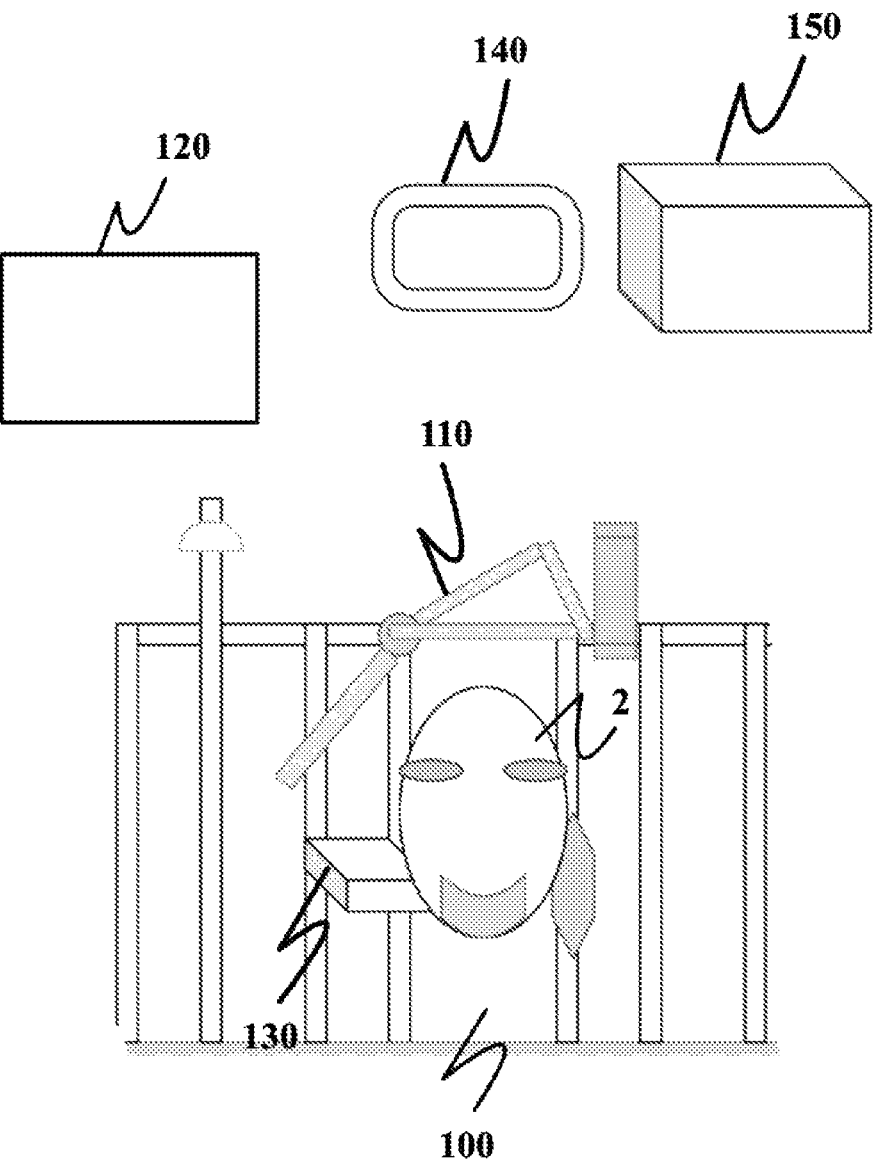

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

SUMMARY OF THE INVENTION

It is a principle object of the present invention to provide effective tools for smart farming.

The invention provides a device for restraining a livestock animal characterized by having at least one open configuration and at least one closed configuration, said device comprising: a) at least one opening configured to allow passage of the upper part of the body of the animal when in the open configuration; b) a locking mechanism having a locked state and an unlocked state, wherein the locking mechanism is configured to switch the device from the open configuration to the closed configuration and from the closed configuration to the open configuration; c) at least one animal identification element configured to identify the livestock animal; d) at least one controller in communication with the animal identification element and the locking mechanism; e) at least one computer comprising data storage, in communication with the controller and the animal identification element; and, optionally, f) at least one signaling element configured to generate a sensory output in communication with the controller.

The invention further provides system for management of a plurality of livestock animals comprising a. a plurality of devices for restraining a livestock animal according to the embodiments of the invention, b. an operation center in communication with the plurality of the devices for restraining a livestock animal, c. a user; and, optionally, d. a user interface.

The invention further provides a method of managing livestock comprising:

a. providing the system for management of a plurality of livestock animals according to the embodiments of the invention;

b. signaling at least one of the plurality of livestock animals by generating a sensory output by the signaling element;

c. identifying the at least one of the plurality of livestock animals;

d. controlling the system performance based on the animal identification data;

e. collected animal related data; and, f. managing the activity of the at least one of the plurality of livestock animals based on the collected data related to the food efficiency of the animal.

The invention further provides a method of controlling profitability of an individual livestock animal comprising:

a. Providing the device for restraining the livestock animal according to the embodiments of the invention;

b. Signaling the livestock animal by generating a sensory output by the signaling element, to approach the device;

c. identifying the livestock animal by the animal identification unit;

d. switching the locking mechanism of the device from the locked state to the unlocked state based on the animal identification data;

e. allowing the livestock animal to approach the device;

f. collecting data related to the livestock animal;

g. sending the data to the operation center;

h. processing the data and, i. generating output related to the profitability of the individual livestock animal based on the collected data; and, optionally, j. providing the output to a user.

The invention further provides a livestock management system comprising:

a plurality of livestock animals;

a livestock habitation area;

a feeding area;

an operation center configured to run a management program, wherein the operation center comprises a processor, a controller, and data storage;

at least one livestock directing device in communication with the operation center, wherein said device is equipped with a gate mechanism, animal identification unit, and, optionally, with a signaling element;

at least one animal restraining device in communication with the operation center, wherein the device is equipped with a locking mechanism, animal identification unit, and, optionally, with a signaling element; and optionally, a feeding system in communication with the operation center;

at least one feeding mechanism in communication with the at least one animal restraining device, feeding system, and the operation center; wherein said feeding mechanism is positioned within the feeding area;

data acquisition module in communication with the feeding system and the operation center; and optionally, a weighting system, in communication with the feeding mechanism, feeding system and the data acquisition module; and, a user;

wherein the management program is configured to fulfill at least one of the actions selected from:

a. receive information regarding an output of each of the plurality of animals;

b. response to the received information regarding animal output and feed consumption;

c. determine feed efficiency and animal profitability for each of the plurality of livestock animals;

d. determine feed efficiency and profitability for a herd of livestock animals;

e. generate recommendations, for each of the plurality of livestock animals, regarding feed amounts, feed composition, animal replacement, insemination timing, breeding programs or drying period timing, responsive to the determined feed efficiency and animal profitability;

f. generate recommendations, for the herd of livestock animals, regarding feed amounts, feed composition, animal replacement, insemination timing, breeding programs or drying period timing, responsive to the determined feed efficiency and animal profitability; and, g. output the generated recommendations.

The invention further provides a method for managing a plurality of livestock animals, the method comprising:

a. measuring an amount of feed consumed by each of a plurality of animals;

b. identifying a composition of feed consumed by each of a plurality of animals c. receiving information regarding an output of each of the plurality of animals;

d. responsive to said measured amount of feed, composition of feed, and said received animal output information, determining feed efficiency and animal profitability for each of the plurality of animals;

e. responsive to said determined feed efficiency and animal profitability, generate recommendations, for each and/or a group of the plurality of animals, regarding feed amounts, feed compositions, animal replacement, insemination timing, breeding programs or drying period timing; and, f. outputting said generated recommendations.

The invention further provides a computer implemented method of managing a plurality of livestock animals comprising:

a. providing the livestock management system according to the embodiments of the invention;

b. collecting data by the data acquisition module;

c. processing the data and assessing the state of each of the plurality of livestock animals based on a set of parameters indicative of the state of each of the plurality of livestock animals;

d. providing instructions to the controller based on the state of each of the plurality of livestock animals; and e. managing the plurality of livestock animals.

Additional features and advantages of the invention will become apparent from the following drawings and description.

DETAILED DESCRIPTION OF EMBODIMENTS OF THE INVENTION

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The invention provides device for restraining a livestock animal. Reference is now made to FIGS. 1 and 2, providing a block diagram illustrating an exemplary embodiment of the device for restraining a livestock animal of the invention (FIG. 1) and an illustration of the device (FIG. 2A-F). The device 200 for restraining a livestock animal is characterized by having at least one closed configuration FIG. 2(A,C,E) and at least one open configuration FIG. 2(B,D,F), and comprises: at least one opening 100 configured to allow passage of the upper part of the body of the livestock animal 2 when in the open configuration; a locking mechanism 110, characterized by having a locked state and an unlocked state, wherein said locking mechanism 110 is configured to switch the device 200 from the closed configuration to the open configuration and from the open configuration to the closed configuration via an axes 111; at least one animal identification element configured to identify the livestock animal 130; at least one controller 140 in communication with the animal identification element 130 and the locking mechanism 110; at least one computer 120 communication with the controller 140 and the animal identification unit 130; and, optionally, at least one signaling element 150 configured to generate a sensory output, in communication with the controller 140. According to some embodiments, the device 200 further comprises data acquisition module 160 in communication with the controller 140 and the computer 120. In one embodiment, the computer further comprises data storage 125.

According to some embodiments of the above restraining device, the controller 140 is configured to fulfill at least one of the functions selected from: receiving instructions from the computer 120; switching the locking mechanism 110 from the locked to the unlocked state; switching the locking mechanism 110 from the unlocked to the locked state; activating the animal identification unit 130; receiving animal id data from the animal identification unit 130, inactivating the animal identification unit 130; activating the signaling unit 150; and, inactivating the signaling unit 150; receiving data from the data acquisition module 160, and transmitting data to the computer 120. As used herein, the term "upper part of the body of the livestock animal" is meant to be understood, without limitation as a portion of the body comprising head, neck and torso, or any portion thereof. In the context of the invention, the term device for restraining a livestock animal" is interchangeable with the term "restraining device" and is meant to be understood, without limitation, as a device designed and/or used to retain the livestock animal in certain position, at the location of interest, for a predetermined and/or desired time interval. The location of the restraining device may dictate the type of activity the animal is engaged in. For example, retaining the animal in a particular device can dictate the type of food the livestock animal is eating, the amount of food the livestock animal is eating, or any other suitable activity. Namely, the device of the invention is designed to allow the livestock animal to pass its head and/or head and neck through the opening and then to "lock" the animal inside the device, in such way that the head and/or head and neck of the animal protrudes from one side of the device and the remainder of the body is on the other side of the device . A non-limiting example of a restraining device is a headlock. The device of the invention may restrain the "animal of choice" according to the animal id information provided by the animal identification unit.

According to some embodiments of the above restraining device, the controller 140 is configured to receive instructions from the computer 120, and to exercise actions according to the instructions received from the computer 120. In one embodiment, the controller 140 is configured to fulfill at least one of the following functions: receiving instructions from the computer 120; switching the locking mechanism 110 from the locked to the unlocked state; switching the locking mechanism 110 from the unlocked to the locked state; activating the animal identification unit 130; receiving animal id data from the animal identification unit 130, inactivating the animal identification unit 130; activating the signaling unit 150; and, inactivating the signaling unit 150; receiving data from the data acquisition module 160, and transmitting data to the computer 120.

According to some embodiments of the above restraining device, the locking mechanism is operated automatically. In one embodiment, the locking mechanism is operated semi-automatically. In another embodiment, the locking mechanism is operated manually. According to some embodiments, the controller is configured to maintain the device in an open configuration for a predetermined time interval, wherein said predetermined time interval is sufficient to allow the livestock animal to perform a task, such as, without limitation, food consumption, veterinary treatment, or milking. As used herein, the term "predetermined time interval" refers, without limitation to a period of time, duration of which is preset either manually or automatically.

According to some embodiments of the above restraining device, animal identification element is image acquisition sensor, data reader, or any other electronical or physical means of identification. In one embodiment, the animal identification element may be an RFID reader, a barcode reader, such as, without limitation a QR reader, and the like, adapted to read at least one data element from a corresponding machine-readable element (e.g., an RFID tag). Alternatively, animal identification element may be based on artificial intelligence (AI). In some embodiments, the machine-readable element may include at least an identification of each livestock animal (e.g., an identifying number). Accordingly, data reader may be configured to read at least one data element including the identity of livestock animal when animal passes near or approaches the device of the invention. The controller may be configured to identify livestock animal according to the at least one read data element. In one embodiment, the animal identification element is physically engaged with the device. In another embodiment, the animal identification element is remote to the device. According to some embodiments of the above restraining device, the animal identification element is designed to recognize machine-readable element on the body parts of the animal, such as, without limitation, head, ears, and/or neck.

According to some embodiments of the above restraining device, the transition from the at least one closed configuration to the at least one open configuration of the device is triggered by the controller based on the animal identification data transmitted to the computer by the animal identification element.

According to some embodiments, the transition from the at least one closed configuration to the at least one open configuration of the device is triggered by the contact of the upper part of the body of the livestock animal with the device. As used herein, the phrase "contact of the upper part of the body of the livestock animal" refers, without limitation to the situation when the livestock animal approaches the restraining device and comes into a physical contact with it, thus exerting pressure on the locking mechanism or other parts of the device.

According to some embodiments, transition from the at least one open configuration to the at least one closed configuration of the device is triggered by the controller based on the animal identification data transmitted to the computer by the animal identification element.

According to some embodiments, the opening of the restraining device in the unlocked state is automated. As used herein, the term "automatic" refers, without limitation to a process carried out automatically, without needing human control. In one embodiment, the transition from closed to open configuration of the device is triggered by livestock animal identification data acquired by the animal identification unit. Animal identification data acquired by the animal identification unit is transmitted to the controller and to the computer. The animal identification data is then processed, verified and instructions to change the configuration are sent to the controller.

According to some embodiments, the restraining device of the invention is located at the opening of an enclosed area, where the at least one livestock animal resides. A non-limiting list of means used to enclose the area includes a fence, a railing, a stockade, a palisade, a partition, a wall, a grille, and a divider.

According to some embodiments, the restraining device of the invention further comprises a weighting system 155 in communication with the controller 140 and the data acquisition element 160. The weighting system of the invention comprises a food weighting unit 1551 and/or animal weighting unit 1552. In the context of the invention the terms "weighting system" and "weighting unit" meant to be understand as a tool or an ensemble of tools for identifying the weight of the desired object/subject. It can include, without limitation, a single weighting tool, or a number of different tools, which can be mechanical and/or digital. It can contain any accessories and assisting tools suitable for assisting and/or promoting and/or supporting the process of acquiring data related to the weight of the desired subject/object. The act of "weighting" can be done automatically, as a result of the instructions provided by the controller and/or manually by a user. The data (weight) of the desired object/subject is collected by the data acquisition module and transmitted to the controller and/or computer. Animal weighting unit and food weighting unit can be parts of the same module. Alternatively, each unit may operate independently of each other. The weighting system according to the embodiments of the invention can be preset to repeatedly perform the step of "weighting".

According to some embodiments of the above restraining device, the weighting system is operably engaged with a trough and/or a manger. According to some embodiments, the restraining device of the invention is proximal to a manger. According to some embodiments, the restraining device further comprises a system for determining the volume of food and/or water before and/or after the consumption. According to some embodiments, the restraining device of the invention is operatively engaged with a milking machinery.

According to some embodiments, the restraining device 200 constitutes a part of a system comprising a pl is in communication with an operation center 500.

Figure 3:
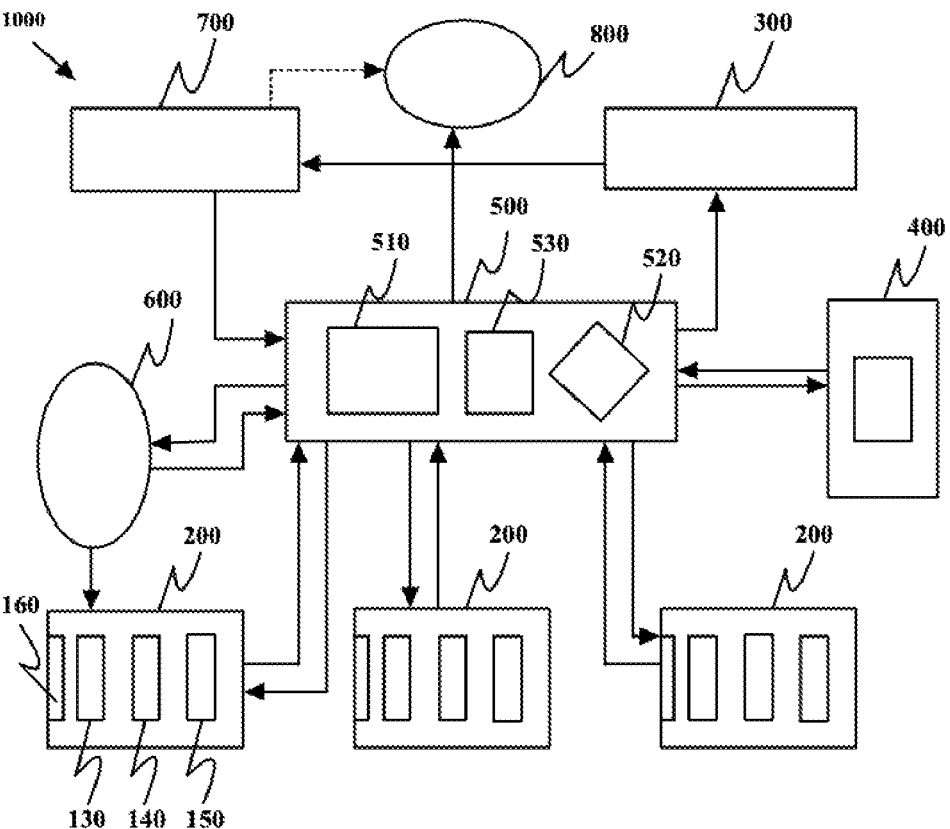
FIG. 3 is a high-level block diagram illustrating an exemplary embodiment of the management system according to the embodiments of the invention.

According to some embodiments, the invention provides a system for management of a plurality of livestock animals. Reference is now made to FIG. 3, a block diagram illustrating an exemplary embodiment of the system of the invention. The system 1000, comprises a plurality of devices for restraining a livestock animal 200 according to the embodiments of the above restraining device; an operation center 500 in communication with the plurality of the devices for restraining a livestock animal 200; a user 300; and, optionally, a user interface 700. According to some embodiments, the system further comprises a milking system 600 in communication with at least one of the plurality of the restraining devices 200 and, optionally with the operation center 500.

According to some embodiments, the system further comprises at least one gate 400 configured to direct at least one of the plurality of livestock animals, in communication with the operation center 500. In one embodiment, the system comprises more than one gate 400. According to some embodiments, the system comprises a plurality of gates 400. In the context of the invention, the gate comprises, without limitation, a gate mechanism, having a locked state and an unlocked state, and configured to allow passage of at least one livestock animal when at the unlocked state. The gate further comprises at least one animal identification element configured to identify the livestock animal; at least one controller in communication with the gate mechanism and the animal identification unit; at least one computer in communication with the controller; and optionally, a signaling element configured to generate a sensory output. According to some embodiments, the gate of the invention is configured to allow smooth passage of the livestock animal, wherein said smooth passage is achieved by the architecture of the gate which allows to follow the contour of the body of the livestock animal.

According to some embodiments, the operation center 500 comprises a data storage 520, processor 530 and a main controller 510, and wherein the operation center is configured to perform at least one of: collecting animal-related data acquired by the data acquisition module 160 of the plurality of the restraining devices 200, collecting environmental data, collecting data related to system performance, processing the collected data, sending instructions to the controller 140 of the at least one of the plurality of devices for restraining a livestock animal 200, providing output related to the individual livestock animal or a plurality of livestock animals to the user 300 based on the collected data, and optionally providing instructions to the at least one gate 400.

According to some embodiments of the above system, the environmental data are selected, without limitation, from air temperature, indoor temperature, humidity, precipitations, barometric pressure, UV irradiation, wind speed, or any other parameter indicative of the environmental conditions. In the context of the invention, the term "environmental data" refers, without limitation, to data relating to the natural world and the impact of human activity on its condition. Similarly, the term "environmental conditions" refers, without limitation to the state of the environment, including natural resources (e.g., flora and fauna), soil, surface water, ground water, any present or potential drinking water supply, subsurface strata or ambient air.

According to some embodiments of the above system, the animal-related data are selected, without limitation, from animal identification (i.d.) data, health status, food intake, body temperature, weight, body scoring, days in milk, no. of milk periods, animal's weight per passage on scale, health-disease data, reproductive status, and milk quality. In the context of the invention, the term "days in milk" refers, without limitation, to the average days in milk at the point of the highest recorded milk production. In the context of the invention, the term "body scoring" refers, without limitation, to a visual assessment of the amount of fat and muscle covering the bones of a cow, regardless of body size the animal i.d. data may include age, gender, reproductive status, lineage, health-disease information, hereditary information, no. of relatives, no. of calves, or any other data indicative of the particular animal. In the context of the invention, the term "health-disease information" or "health-disease data" refers, without limitation to any suspicion of any health problem that is concluded from changes in feed intake, feeding behavior (no of meals, duration of meal), milk yield and composition According to some embodiments of the above system, the output generated by the operation center 500 includes, without limitation, at least one of the following parameters: daily feed intake per animal, feed intake per animal, feed intake per meal, meal duration, feeding rate, milk costs, daily milk yield, number of milking per animal per day, number of meals per day, Residual feed intake (RFI), food cost, food composition, feed efficiency, animal destined for selection, and income over feed cost (IOFC). As used herein, the term "RFI" refers, without limitation, to animal's feed efficiency independent of growth performance. The RFI is calculated actual feed intake minus the expected feed intake. As used herein, the term "IOFC" refers, without limitation, to the portion of income from milk sold that remains after paying for purchased and farm-raised feed used to produce the milk.

According to some embodiments, the above system 1000 is configured to differentially control the amount of food and/or water dispatched to the plurality of the devices for restraining the livestock animal.

According to some embodiments, the above system 1000 is configured to differentially control the composition of food and/or water dispatched to the plurality of the devices for restraining the livestock animal.

According to some embodiments, the above system further comprises a food dispatching unit 800 in communication with the operation center 500 and optionally, with user interface 700. The food dispatching unit is configured to differentially dispatch and/or to differentially instruct to dispatch the type and/amount of food and/or number of meals according to the output generated by the operation center 500 for each of the plurality of the livestock animal. The process of dispatching the food can be fully automated. Alternatively, the process dispatching the food can be manual or semi-manual.

Figure 4:
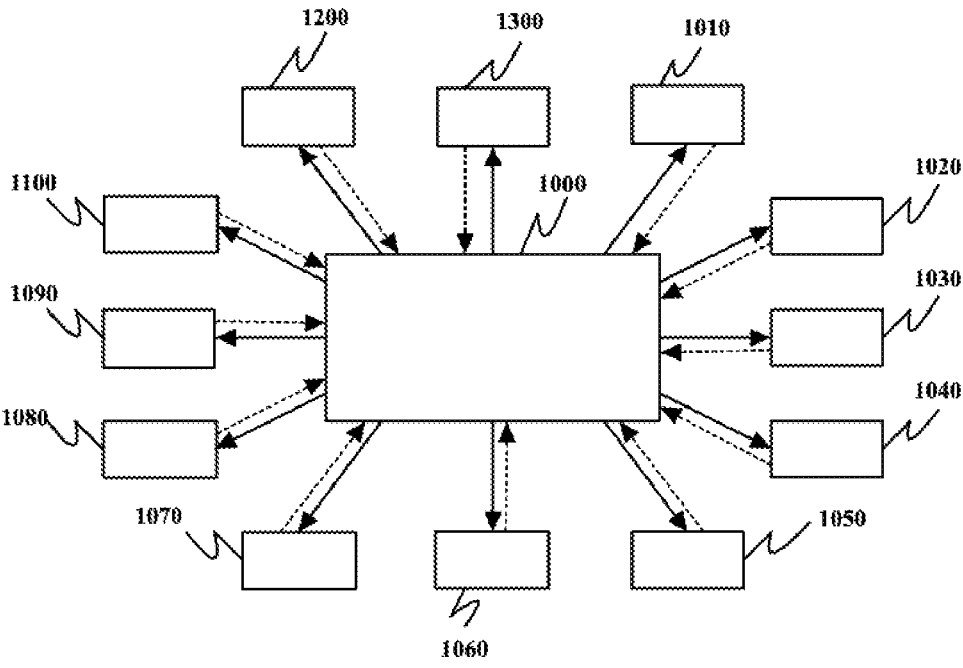
FIG. 4 is a high-level block diagram illustrating an exemplary embodiment of the third-party interfaces of the management system according to the embodiments of the invention.

Reference is now made to FIG. 4, block diagram illustrating an exemplary embodiment of possible interfaces of the above system 1000. The list of interfaces in communication with the system 1000 include, without limitation, animal feed suppliers 1010, animal feed manufacturers 1020, distribution channels 1030, veterinary services 1040, bank 1050, storage facilities 1060, airline services 1070, port authority 1080, railway system 1090, milk industry related facilities 1100, meat industry related facilities 1200, meteorologic services 1300 or any other service and/or vendor and/or governmental/privet structure and/or retail chains and/or farms/individual farmers/farming facilities.

According to some embodiments, the above system comprises an enclosed area where the plurality of livestock animal resides. The enclosed area is surrounded by a barrier such as, without limitation a fence, a railing, a stockade, a palisade, a partition, a wall, a grille, a divider, or any other physical barrier suitable for generating separation between the inner side where the livestock animal reside and the outer side. The barrier can be composed of a number of means. The system may include more than one enclosed area.

According to some embodiments of the above system, the plurality of the restraining devices according to the embodiments of the invention, and/or one or more gates are installed within the barrier surrounding the enclosed area. When installed within the barrier, the plurality of the restraining devices according to the embodiments of the invention, allow continuous separation of the inner side from the outer side. In one embodiment, a default configuration of the restraining devices is a "closed" configuration and the default configuration of the gate is a "locked" configuration. Thus, the plurality of livestock animal residing within the enclosed area have no access to food and/or water and/or outer side of the barrier. The system according to the above embodiments, allows to control activity of an individual animal by signaling to the animal and selectively providing the animal with an access to food and/or water, milking machinery, weighting system, veterinary treatment, calves or any other desired activity. The system according to the above embodiments, allows continuous monitoring at the level of an individual animal to the entire herd (or part of the herd) and to acquire data related to profitability of the farm, of an individual animal, and/or a herd, and making decisions regarding amount and/or composition of meals, reproduction, selection, and any additional parameters relevant to the user. In the context of the invention, the term user, refers, without limitation, to natural person and/or a machine and/or an organization that may benefit from the system according to the above embodiments. As used herein, the term "user interface" refers, without limitation, to any means by which the user and a computer system interact, in particular the use of input devices and software.

In the context of the invention, the term "livestock animal" refers, without limitation, to beef cattle, dairy cattle, sheep, goats, domestic pigs, and horse. According to some embodiments, the livestock animals are herdic animals that prefer to move in groups and are sensitive to sounds made by a group leader or a shepherd.

The restraining device according to the above embodiments and/or the system according to the above embodiments may allow to signal by means of sensory output to a single livestock animal or a group of animals in the herd. A non-limiting list of signals includes sounds, vibration, touch, light, electric current, and smell. The signal is generated by a signaling element 150, which can be situated, without limitation, on the restraining device 200, along the pass to the restraining device, on the livestock animal, or any other location where generated signal can reach the animal.

According to some embodiments, the signal is recognizable by the livestock animal and is associated with a certain stimulus and/or action. The non-limiting examples of signals and correlated stimuli and/or actions include: light from the restraining device to the animal to approach the specific location; light showing the animal the way to the correct restraining device; light signaling to an individual animal that the restraining device is closed; light signaling to the an individual animal that the restraining device is open; light signaling to a group of animals that the restraining device is closed; light signaling to a group of animals that the restraining device is open; sound coming from the gate signaling to the animal to approach the restraining device; pleasant sound correlated with pleasant and rewarding action; unpleasant sound correlated with punishment, for instance sound indicating that the animal is moving in the wrong direction; vibration from the device located on the animal; certain type of vibration associated with pleasant and rewarding action; certain type of vibration associated with negative and punishing action; vibrating device which is not situated on the animal; electric shock. The signal is an indication that a specific restraining device is unlocked and may be opened. In some embodiments, when reaching the restraining device, the locking mechanism may allow the animal itself to push and open and pass its head and neck through the opening.

According to some embodiments, the system may include identifying the passing/approaching animal using a tag attached to the animal.

According to some embodiments of the above system and/or above-restraining device, on the other side of the restraining device the animal may find an activity, such as, without limitation, a feeding station (a manger) or a milking machine (e.g., a robotic milking system). According to some embodiments, the system may facilitate granting of a permission to move into and/or through a specific restraining device to only a selected animal/group of animals.

According to some embodiments, the system of the invention may identify the animal approaching the restraining device and/or a gate and may change the state of the restraining device/gate according to the permission of each animal.

According to some embodiments, the data acquisition module of the system may allow collecting data related to the behavior and activity of each animal. For example, a sensor such as a scale may be attached to a manger filled with food located beyond the gate and/or restraining device. When an identified animal passes through the gate and/or opens the restraining device, embodiments of the system may receive from the sensor (e.g., the scale) the weight of the manger at the beginning of the feeding and the weight after the animal has left the manger. Embodiments may consequently calculate how much food the animal has consumed. The amount of food consumed by each livestock animal may be correlated with the production of each animal. This information may be accumulated over a period of time (e.g., at a specific day, over a number of days, weeks, months, years, etc.) Collecting such data for a group of animals or even for the entire herd may allow efficient and more accurate feeding of the herd, thus increasing the productivity of the herd and the food efficiency of the livestock farm.

The term feed efficiency (FE) is used in the art to indicate a relation between a livestock animal's food consumption and its productivity. As a simplistic example, FE of a specific animal may indicate a ratio between the animal's production of milk and the amount of food consumed by that animal.

According to some embodiments, the system of the invention comprises a training module, wherein said module is configured to train the livestock animal to recognize the sensory output generated by the signaling element. In one embodiment, the at least one livestock animal is trained to recognize the signal generated by the at least one signaling element and to approach the gate and/or restraining device of the invention. As used herein, the term "trained" refers, without limitation, to acquiring particular skill or type of behavior by the livestock animal through practice and instruction over a period of time.

According to some embodiments, the invention provides a method of managing livestock. Reference is now made to FIG. 5, a flowchart illustrating an exemplary embodiment of the above method. The method for managing livestock comprises the steps of: providing a system for management of at least one livestock animal according to the embodiments of the above system 5000; identifying the at least one livestock animal 6000; signaling at least one of the plurality of livestock animals by generating a sensory output by the signaling element; identifying the at least one of the plurality of livestock animals 7000; controlling the system performance based on the animal identification data 8000; collecting animal related data 9000; and, managing the activity of the at least one of the plurality of livestock animals based on the collected data related to the food efficiency of the animal 10000.

According to some embodiments of the above method, the step [8000] may include, without limitation, locking the restraining device, unlocking the restraining device, closing the gate, and/or opening the gate.

According to some embodiments of the above method, the step [10000] may include, without limitation, feeding the animal, milking the animal, weighting the animal, treating the animal, guiding the animal to a specific location, and training the animal.

According to some embodiments, the invention provides a method of controlling profitability of an individual livestock animal. Reference is now made to FIG. 6, a flowchart illustrating an exemplary embodiment of the above method. The method of controlling profitability of an individual livestock animal comprises the following steps: providing the device for restraining the livestock animal according to the above embodiments 11000; signaling the livestock animal by generating a sensory output by the signaling element, to approach the device 12000; identifying the livestock animal by the animal identification element 13000; switching the locking mechanism of the device from the locked state to the unlocked state based on the animal identification data 14000; allowing the livestock animal to approach the restraining device 15000; collecting data related to the livestock animal 16000; sending the data to the central operating system 17000; processing the data 18000; generating output related to the profitability of the individual livestock animal based on the collected data 19000; and, optionally, providing the output to a user 20000.

According to some embodiments of the above method, the output related to the profitability of the individual livestock animal includes, without limitation, daily feed intake per animal, feed intake per animal, feed intake per meal, meal duration, feeding rate, milk costs, daily milk yield, days in milk, IRF, number of milking per animal per day, food cost, feed efficiency, and IOFC.

According to some embodiments, the restraining device according to above embodiments, further comprises an electric shocker. In one embodiment, the electric shocker is the sensory output generated to signal the livestock animal to seize performing a desired activity. For example, to seize consuming the food.

According to some embodiments, the restraining device according to above embodiments, maybe used for immobilizing the livestock animal for various procedures and activities. Non-limiting examples of such procedures include medical treatment, artificial fertilization, or any other procedure requiring restraining of the livestock animal.

According to some embodiments, the restraining device according to above embodiments, may remain at the open configuration, thus letting the livestock animal to push its head/head and neck in and out of the device.

Unless explicitly stated, the method embodiments described herein are not constrained to a particular order or sequence. Additionally, some of the described method embodiments or elements thereof can occur or be performed simultaneously, at the same point in time, or concurrently.

It should be appreciated that according to some embodiments, the system of the invention may be portable and movable (e.g., deployed at a meadow, where a herd may be grazing).

According to some embodiments, the locking mechanism may include any electromagnetic or electromechanical device.

Figure 7:
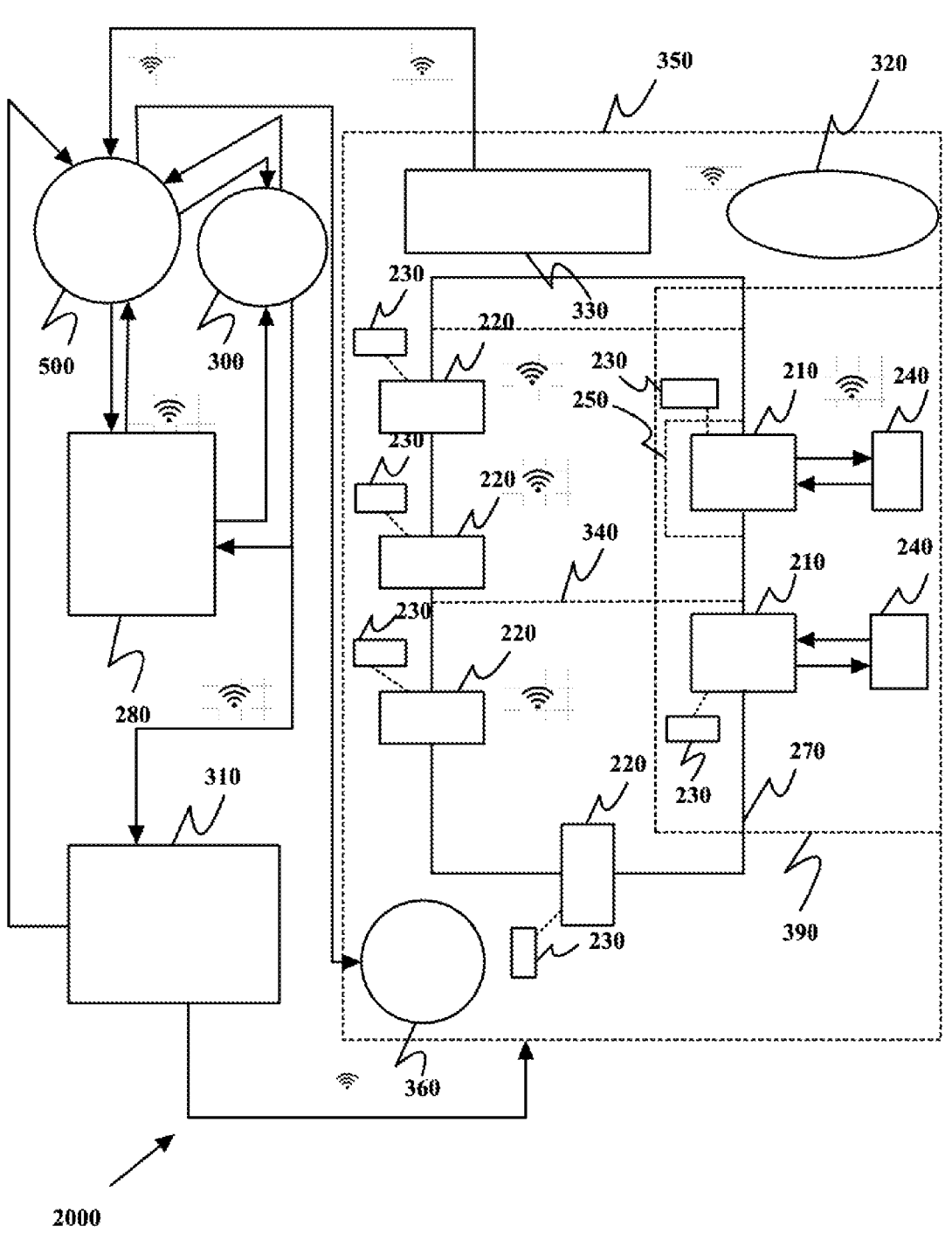
FIG. 7 is a high-level block diagram illustrating an exemplary embodiment of the livestock management system.
Figure 8:
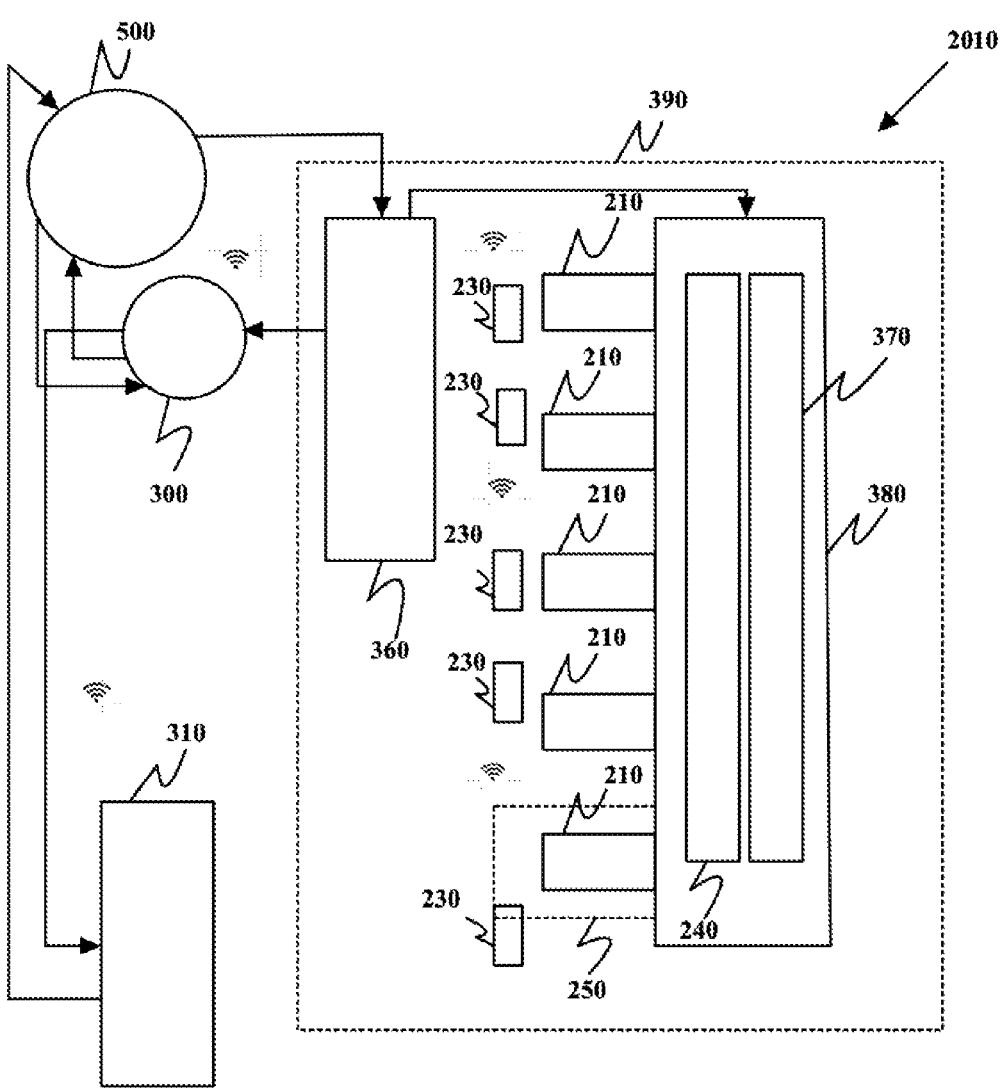
FIG. 8 is a high-level block diagram illustrating an exemplary embodiment of the feeding component of the livestock management system of the invention.

According to some embodiments, the invention provides livestock management system. Reference is now made to FIGS. 7 and 8, illustrating an exemplary embodiment of the system of the invention and the feeding component of the system 2010 respectively. The system 2000, comprises a plurality of livestock animals; a livestock habitation area 350; a feeding area 390; an operation center 500 configured to run a management program, wherein the operation center 500 comprises a processor, a controller, and data storage; at least one livestock directing device 220 in communication with the operation center 500, wherein said device is equipped with a gate mechanism (not shown), animal identification unit (not shown), and, optionally, with a signaling element 230; at least one animal restraining device 210 in communication with the operation center 500, wherein the device is equipped with a locking mechanism, animal identification unit (not shown), and, optionally, with a signaling element 230; and optionally, a feeding system 360 in communication with the operation center 500; at least one feeding mechanism 380 in communication with the at least one animal restraining device 210, feeding system 360, and the operation center 500; wherein said feeding mechanism is positioned within the feeding area 290; data acquisition module 320 in communication with the feeding system 360 and the operation center 500; and, optionally, a weighting system 240, in communication with the feeding mechanism 380, feeding system 260 and the data acquisition module 320; and, a user 310. According to some embodiments of the above system, the management program is configured to fulfill at least one of the actions selected from:

a. receive information regarding an output of each of the plurality of animals;
 b. response to the received information regarding animal output and feed consumption;
 c. determine feed efficiency and animal profitability for each of the plurality of livestock animals;
 d. determine feed efficiency and profitability for a herd of livestock animals;
 e. generate recommendations, for each of the plurality of livestock animals, regarding feed amounts, feed composition, animal replacement, insemination timing, breeding programs or drying period timing, responsive to the determined feed efficiency and animal profitability;
 f. generate recommendations, for the herd of livestock animals, regarding feed amounts, feed composition, animal replacement, insemination timing, breeding programs or drying period timing, responsive to the determined feed efficiency and animal profitability; and,
 g. output the generated recommendations.

According to some embodiments of the above system, the management program is configured to fulfill more than one actions a-g. In one embodiment, the management program is configured to fulfill all the actions a-g.

According to some embodiments of the above system, the feeding system 360 is configured to supply the at least one feeding mechanism 380 with a predetermined amount and/or type of feed; and wherein the feeding mechanism 380 is configured to transmit to the operation center 500 by means of data acquisition module 320 data related to the amount of feed consumed by an individual livestock animal, composition of feed consumed by an individual livestock animal at the respective feeding mechanism 380.

According to some embodiments, all or part of the restraining devices and/or directing devices are installed and/or embedded within a barrier 270.

According to some embodiments of the above system, each of the plurality of livestock animals is equipped with a unique identifier, readable by the animal identification unit, and wherein said unique identifier is configured to read and/or transmit animal identification data to the operation center 500.

According to some embodiments, the movement of each of the plurality of livestock animals is controlled by means of generating a plurality of unique sensory signals output, wherein each of the unique sensory signals is associated with a respective one of the plurality of livestock animals and with an activity to be performed by said respective one of the plurality of livestock animals. When referring to the "performance of an activity" by the animal, it should be noted that not performing or seizing performing a task upon receiving a signal are included under the "performance of activity". In the context of the invention the phrase "movement of each of the plurality of livestock animals" is meant to be understood as movement inside the habitation area towards various areas, such as, without limitation, feeding area, milking area, training, are, calves area, cooling area, or any other area that might be relevant for the above system The movement can also be in and out of the habitation area, for example, movement to an adjacent habitation area or moving outside the habitation area. In the context of the invention, the phrase "each of the plurality of livestock animals" does not necessarily refers to a single animal, rather to a situation when an individual animal or a group of animals are individually controlled. Additionally, the system according to the above embodiment can perform at the level of a single animal, a group of animals or the entire herd—dependent on the output requested by the user.

According to some embodiments, the above system further configured to direct the individual livestock animal of the plurality of livestock animals to at least one of a weighting system, milking machinery, feeding area, cooling area, selection for breeding, playground area, training area, mental activity area, and veterinary treatment area.

According to some embodiments, the above system further comprises a training module, configured to train each of the plurality of livestock animals to recognize at least one sensory output and to perform a task associated with said sensory output.

According to some embodiments of the above system, the task associated with the sensory output is approaching the animal directing device associated with said sensory output and/or approaching animal restraining device associated with said sensory output. In one embodiment, the animal will approach the directing and/or restraining device associated with the sensory output, when the default configuration is locked. In case animal identification element/unit recognizes the animal, the configuration is switched to "open" and the animal enters the device. If animal is not recognized by the animal identification element/unit, the configuration of the device remains locked.

According to some embodiments, the above system is further configured to train each of the plurality of livestock animals to allow close identification by the animal identification unit. As used herein, the term "close identification" is meant to be understood as animal identification while in a close contact with the animal identification element. For the purposes of close identification, the animal is trained to approach the identification element in a specific orientation to allow said close identification.

According to some embodiments of the above system the weighting system comprises at least one of animal weighting module, feed weighting module, and feed volume measuring module. The weighting system according to the embodiments of the invention can contain one, two or three of the above modules. The animal weighting module, feed weighting module, and, optionally, feed volume measuring module are identified by respective numbers 250, 240, and 370 (FIGS. 7 and 8).

According to some embodiments of the above system, the feeding mechanism 380 (FIG. 8) is a trough, a manger, a feeding station, or any other suitable means known in the art.

According to some embodiments, the above system is further configured to communicate with third parties 280 (FIG. 7). As used herein, the term "third party" refers to any module and/or natural person and/or organization and/or entity, which does not constitute part of the system according to the embodiments of the invention. A non-limiting list of third parties includes animal feed vendors, animal products distribution channels, veterinary services, neighbor farms, governmental service, banks, retail store, or any other relevant entity.

According to some embodiments, the invention provides a method for managing a plurality of livestock animals. Reference is now made to FIG. 9 illustrating an exemplary embodiment of the above method. The method comprises the steps of: measuring an amount of feed consumed by each of a plurality of animals 600; identifying a composition of feed consumed by each of a plurality of animals 610; receiving information regarding an output of each of the plurality of animals 620; responsive to said measured amount of feed, composition of feed, and said received animal output information, determining feed efficiency and animal profitability for each of the plurality of animals 630; responsive to said determined feed efficiency and animal profitability, generate recommendations, for each and/or a group of the plurality of animals, regarding feed amounts, feed compositions, animal replacement, insemination timing, breeding programs or drying period timing 640; and, outputting said generated recommendations 650.

According to some embodiments, the above method further comprises the step of outputting, for each of the plurality of animals, said respective determined feed efficiency and animal profitability 660.

According to some embodiments, the above method further comprises the step of controlling the movement of the plurality of animals into a feeding area via one or more animal directing device and/or animal restraining device 670.

According to some embodiments of the above method, each of the plurality of animals exhibits a unique identifier, the method further comprising reading the unique identifier of each of the plurality of animals, wherein said controlling of the movement of the plurality of animals into the feeding area is responsive to the respective unique identifiers.

According to some embodiments, the above method further comprises the step of outputting a plurality of unique sensory signals, each of the unique sensory signals associated with a respective one of the plurality of animals and/or a group of livestock animals.

According to some embodiments, the invention provides a computer implemented method of managing a plurality of livestock animals. Reference is now made to FIG. 10, illustrating an exemplary embodiment of the above method. The method 700 comprises the step of: providing the livestock management system according to the above embodiments 710; collecting data by the data acquisition module 720; processing the data and assessing the state of each of the plurality of livestock animals based on a set of parameters indicative of the state of each of the plurality of livestock animals 730; providing instructions to the controller based on the state of each of the plurality of livestock animals 740; and, managing the plurality of livestock animals 750. As used herein, the term "management" and/or "managing" refers, without limitation, to controlling animal movements, activities, health conditions, and other relevant parameters, at the level of a single animal, a group of animals and an entire herd. The management is achieved by a combination of a unique, smart hardware Restraining and Directing devices, in combination with an integrative software allowing autonomous, fully and/or semi-automatic performance of multiple tasks, giving and receiving feedback and data either processed or unprocessed or both.

According to some embodiments of the above method, data comprise at least one of animal-identification data, environmental data, food-related data, animal-related data or any combination thereof.

According to some embodiments of the above method, the step of assessing the state of each of the plurality of livestock animals comprises using a trained neural network.

According to some embodiments of the above method, the step of processing comprises steps of computing said data using computer implemented algorithm trained to generate output based on the acquired data.

According to some embodiments of the above method, the computer implemented algorithm is trained to generate output based on predetermined feature vectors or attributes extracted from the acquired data.

According to some embodiments of the above method, step of applying a machine learning process with the computer implemented trained algorithm to determine the state of each of the plurality of livestock animal.

According to some embodiments of the above method, the algorithm is implemented with a machine learning process using a neural network with the processed data.

According to some embodiments of the invention, animal restraining device is a headlock.

According to the embodiments of the above device, systems and methods, animal restraining device is a headlock.

According to the embodiments of the above device, systems and methods, animal directing device is a gate.

According to some embodiments, the controller may include a processor (e.g., a central processing unit processor (CPU), a graphics processing unit (GPU), a chip or any suitable computing or computational device), an operating system, memory, executable code, storage, input devices (e.g. a keyboard or touchscreen), and output devices (e.g., a display), a communication unit (e.g., a cellular transmitter or modem, a Wi-Fi communication unit, or the like) for communicating with remote devices via a communication network, such as, for example, the Internet. Processor of controller may be configured to execute program code to perform operations described herein. The system described herein may include one or more controller(s).

Operating system may be or may include any code segment (e.g., one similar to executable code described herein) designed and/or configured to perform tasks involving coordinating, scheduling, arbitrating, supervising, controlling or otherwise managing operation of computing device, for example, scheduling execution of software programs or enabling software programs or other modules or units to communicate.

Memory may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory may be or may include a plurality of, possibly different memory units. Memory may be a computer or processor non-transitory readable medium, or a computer non-transitory storage medium, e.g., a RAM.

Executable code may be any executable code, e.g., an application, a program, a process, task or script. Executable code may be executed by processor possibly under control of operating system. For example, executable code 148 may be a software application that performs methods as further described herein, for example, for controlling directing livestock or methods of controlling a food efficiency of a livestock farm.

For the sake of clarity, a system according to embodiments of the invention may include a plurality of executable code segments similar to executable code that may be stored into memory and cause processor to carry out methods described herein.

Storage may be or may include, for example, a hard disk drive, a universal serial bus (USB) device or other suitable removable and/or fixed storage unit. In some embodiments, some of the components may be omitted. For example, memory may be a non-volatile memory having the storage capacity of storage. Accordingly, although shown as a separate component, storage may be embedded or included in memory.

Input devices may be or may include a keyboard, a touch screen or pad, one or more sensors or any other or additional suitable input device. Any suitable number of input devices may be operatively connected to controller. Output devices may include one or more displays or monitors and/or any other suitable output devices. Any suitable number of output devices may be operatively connected to computing device. Any applicable input/output (I/O) devices may be connected to controller. For example, a wired or wireless network interface card (NIC), a universal serial bus (USB) device or external hard drive may be included in input devices and/or output devices.

Communication unit may be configured to communicate, either wirelessly or by wired communication with the controllable elements of the systems of the invention. For example, communication unit may be configured to receive readings from reader, signals and data from sensor, may communicate with the locking mechanism of gates and/or restraining device es and may communicate with signaling element.

Embodiments of the invention may include an article such as a computer or processor non-transitory readable medium, or a computer or processor non-transitory storage medium, such as for example a memory, a disk drive, a remote processing unit and data storage, or a USB flash memory, encoding, including or storing instructions, e.g., computer-executable instructions, which, when executed by a processor or controller, carry out methods disclosed herein. For example, an article may include a storage medium such as memory, computer-executable instructions such as executable code and a controller such as processor. Such a non-transitory computer readable medium may be for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including, semiconductor devices such as read-only memories (ROMs) and/or random-access memories (RAMs), flash memories, electrically erasable programmable read-only memories (EEPROMs) or any type of media suitable for storing electronic instructions, including programmable storage devices. For example, in some embodiments, memory is a non-transitory machine-readable medium.

A system according to embodiments of the invention may include components such as, but not limited to, a plurality of central processing units (CPU), GPUs, or any other suitable multi-purpose or specific processors or controllers (e.g., controllers similar to processor), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device.

According to some embodiments, system may include a camera that may in communication with controller and may be configured to capture an image of a livestock animal approaching the restraining device and/or gate. For example, camera may be associated with one or more proximity sensors, adapted to detect movement and/or existence of at least one livestock animal. Controller may receive at least one image of the animal approaching the gate and/or restraining device from camera, and may identify the animal based on the received image, using any known image analysis and image recognition techniques known in the art.

The terminology used herein is for the purpose of describing particular embodiments only and is not intended to be limiting of the invention.

According to some embodiments, the method of the present invention comprises steps of applying a machine learning process with the computer implemented trained algorithm to determine the state of the livestock animal, a group of animals or a herd. Thus, it is within the scope of the present invention that the algorithm (or computer readable program) is implemented with a machine learning process using a neural network with the processed data. The term "training" in the context of machine learning implemented within the system of the present invention refers to the process of creating a machine learning algorithm. Training involves the use of a deep-learning framework and training dataset. A source of training data can be used to train machine learning models for a variety of use cases, from failure detection to consumer intelligence. The neural network may compute a classification category, and/or the embedding, and/or perform clustering, and/or detect objects from trained classes for identifying state of an individual plant in the context of pollination. As used herein the term "class" refers, without limitation, to a set or category of things having some property or attribute in common and differentiated from others by kind, type, or quality.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts.

As used herein, the term "classifying" may sometimes be interchanged with the term clustering or tagging, for example, when multiple data sets are analyzed, each image may be classified according to its predefined feature vectors and used to creating clusters, and/or the data may be embedded and the embeddings may be clustered. The term "desired category" may sometimes be interchanged with the term embedding, for example, the output of the trained neural network in response to the dataset may be one or more classification categories, or a vector storing a computed embedding. It is noted that the classification category and the embedding may be outputted by the same trained neural network, for example, the classification category is outputted by the last layer of the neural network, and the embedding is outputted by a hidden embedding layer of the neural network.

The architecture of the neural network(s) may be implemented, for example, as convolutional, pooling, nonlinearity, locally connected, fully connected layers, and/or combinations of the aforementioned.

It is noted that the tagging and classifying of the plants in the images or the plant state characteristic targets may be manually or semi manually entered by a user (e.g., via the GUI, for example, selected from a list of available phenotypic characteristic targets), obtained as predefined values stored in a data storage device, and/or automatically computed.

The term "feature vector" refers hereinafter in the context of machine learning to an individual measurable property or characteristic or parameter or attribute of a phenomenon being observed e.g., detected by a sensor. It is herein apparent that choosing an informative, discriminating and independent feature is a crucial step for effective algorithms in pattern recognition, machine learning, classification and regression. Algorithms using classification from a feature vector include nearest neighbor classification, neural networks, and statistical techniques. In computer vision and image processing, a feature is an information which is relevant for solving the computational task related to a certain application. Features may be specific structures in the image such as points, edges or objects. Features may also be the result of a general neighborhood operation or feature detection applied to the image. When features are defined in terms of local neighborhood operations applied to an image, a procedure commonly referred to as feature extraction is executed.

According to some embodiments, the controller may receive the identification of livestock animal from other sources, for example, from a user via a user interface or the like and the invention is not limited to a specific form of receiving identification of a livestock animal.

In some embodiments, directing at least one livestock animal to a first feeding station and receiving the data may be carried out for each livestock animal over a predetermined period of time. Therefore, a method according to some embodiments of the invention may allow to associate between the food consumption and the productivity of individual livestock animals.

At least one of: a type of food and an amount of food to be provided based on the received data may be determined. In some embodiments, controller may determine the type of food and/or an amount of food that may increase the food efficiency of the farm. For example, controller may correlate between the amount and the type of food consumed by the animal and its productivity at each day for 10 days. The controller may select to increase or decrease the amount or change the mixture provided to each livestock animal in order to increase the productivity of the animal (e.g., increase the amount of milk).

According to some embodiments, the controller may determine at least one of: a type of food and an amount of food for a first group of livestock. For example, controller may decide to change the food composition of a group of animals in order to increase their productivity. For example, controller may direct this group to a specific restraining device leading to a second manger having different composition of the provided food.

According to some embodiments, controller may receive (e.g., via input device, from a database on storage element, and the like) data related to a profile of at least one livestock animal. The received profile data of the at least one livestock animal may include, for example, data relating to the animal's age, gender, species, size, weight etc. In one embodiment, the profile data may include information relating to the animal's health, including for example occurrence of past or present illnesses, pregnancy, birth-giving, and the like.

Controller may further determine at least one of: a type of food and an amount of food to be provided also based on the received animal profile data. For example, controller may group together animals having similar related data, for example, 2-4 years old animals after giving birth and may direct all these animals to a specific manger filled with a food mixture that may be suitable to this group of animals.

Therefore, a method and a system according to some embodiments of the invention may allow a farmer to feed individual animals with precise nutrition by directing the animals to a specific feeding station providing the nutrition. The farmer may use several mangers, each providing different types of food and direct specific individual animals to the most suitable manger. The farmer can load (automatically or manually) the precise amount of food to be provided to each animal. In some embodiments, system may enable the farmer to provide to a single animal the first type of food at a first manger (e.g., loaded with forages) located beyond a first restraining device and/or gate and a second type of food (e.g., the concentrate) at a second manger located beyond a second restraining device and/or gate.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof. As used herein the terms "comprises", "comprising", "includes", "including", "having" and their conjugates mean "including but not limited to". The term "consisting of" means "including and limited to".

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "operatively coupled" to, "operatively linked" to, "operatively engaged" with, "connected" to, "coupled" with, "contacting," etc., another element, it can be directly on, attached to, connected to, operatively coupled to, operatively engaged with, coupled with and/or contacting the other element or intervening elements can also be present. In contrast, when an element is referred to as being "directly contacting" another element, there are no intervening elements present.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section.

Certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

All publications, patent applications, patents, and other references mentioned in the disclosures of these publications in their entireties are hereby incorporated by reference into this application in order to more fully describe the state of the art to which this invention pertains. In case of conflict, the patent specification, including definitions, will prevail. In addition, the materials, methods, and examples are illustrative only and not intended to be limiting. Throughout this application various publications, published patent applications and published patents are referenced.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description. While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention. Various embodiments have been presented. Each of these embodiments may of course include features from other embodiments presented, and embodiments not specifically described may include various features described herein.

The invention claimed is:

1. A system for management of a plurality of livestock animals in a group, the system comprising:

a. a plurality of devices for restraining livestock animals, each device having at least one open configuration and at least one closed configuration and comprising:

at least one opening configured to allow passage of an upper part of a body of a livestock animal when the device is in the open configuration;

a locking mechanism having a locked state and an unlocked state, wherein the locking mechanism is configured to switch the device from the open configuration to the closed configuration and from the closed configuration to the open configuration, wherein the locking mechanism comprises an electromagnetic or electromechanical device configured to switch the device via an axis;

at least one animal identification element configured to identify individual livestock animals;

at least one controller in communication with the animal identification element and the locking mechanism;

at least one local computer comprising data storage, in communication with the controller and the animal identification element; and at least one signaling element, in communication with the controller, the signaling element configured to generate a sensory output recognizable by the livestock animal, the sensory output associated with a stimulus and signaling the livestock animal to implement a predefined action;

b. a centralized operation center comprising a data storage, processor and a main controller, in communication with the plurality of devices; and c. a user interface, wherein the controller of each device is configured to automatically control access of individual livestock animals to feeding areas by selectively switching the locking mechanism between the locked and unlocked states based on animal identification data and individual animal feeding data stored in the computer;

wherein the signaling element of each device is configured to generate animal-specific sensory outputs, to direct identified livestock animals to approach specific devices for controlled feeding access; and wherein the operation center is configured to monitor individual animal feeding behavior across the plurality of devices to optimize feeding efficiency for each individual livestock animal in the group.

2. The system of claim 1, further comprising a milking system in communication with at least one of the plurality of devices and with the operation center.

3. The system of claim 1, wherein at least one of the devices for restraining livestock animals comprises a gate.

4. The system of claim 1, wherein the operation center is configured to perform at least one of: collecting animal-related data acquired by a data acquisition module of the plurality of the devices; collecting environmental data; collecting data related to system performance, processing collected data; sending instructions to the controller of the at least one of the plurality of devices for restraining a livestock animal, providing output related to the livestock animal or a plurality of livestock animals based on collected data, and providing instructions to the controller.

5. The system of claim 4, wherein the environmental data are selected from air temperature, indoor temperature, humidity, precipitations, barometric pressure, UV irradiation, and wind speed.

6. The system of claim 4, wherein the animal-related data is selected from: animal identification data; health status; food intake; body temperature; weight; body scoring; days in milking, number of milking periods; animal weight per passage on scale; health-disease data; reproductive status; and milk quality.

7. The system of claim 4, wherein the output comprises at least one of: daily feed intake per animal; feed intake per animal; feed intake per meal; meal duration; feeding rate; milking costs; daily milk yield; number of milkings per animal per day; number of meals per day; residual feed intake (RFI); food cost; food composition; feed efficiency; animal destined for selection; and income over feed cost (IOFC).

8. The system of claim 1, further configured to differentially control the amount of food and/or water dispatched to the plurality of the devices for restraining the livestock animal.

9. The system of claim 1, further comprising a data acquisition module in communication with the controller and the computer, wherein the controller is configured to fulfill at least one of the functions selected from: receiving instructions from the computer; switching the locking mechanism from the locked state to the unlocked state; switching the locking mechanism from the unlocked state to the locked state; activating the animal identification unit; receiving animal identification data from the animal identification unit, inactivating the animal identification unit; activating the signaling unit; inactivating the signaling unit; receiving data from the data acquisition module; and transmitting data to the computer, and wherein the data acquisition module is configured to collect animal feeding behavior data for generating the individual animal feeding data stored in the computer.

10. The system of claim 1, wherein the animal identification element is selected from image acquisition sensor, data reader, or a combination thereof; and, wherein the animal identification element is physically engaged with a portion of the device or remote to the device.

11. The system of claim 1, wherein a transition from the closed configuration to the open configuration of the device is triggered by contact of the upper part of a body of the livestock animal with the device.

12. The system of claim 1, wherein a transition from the closed configuration to the open configuration of the device is triggered by the controller based on animal identification data transmitted to the computer by the animal identification element.

13. The system of claim 9, further comprising a weighting system in communication with the controller and the data acquisition module, wherein the weighting system comprises a food weighting unit, and wherein the weighting system is operably engaged with a trough and/or a manger.

14. The system of claim 9, wherein the data acquisition module is configured to acquire data selected from: data related to the livestock animal; environmental data; and data related to the device.

15. The system of claim 1, wherein the sensory output is selected from the group consisting of: sound; vibration; touch; light; electric current; and smell.

16. The system of claim 1, wherein the stimulus and the predefined action is selected from the group consisting of:
light from the restraining device to approach a specific location;
light indicating a path to a selected restraining device;
light signaling that the restraining device is in the closed configuration;
light signaling that the restraining device is in the open configuration;
a sound signaling to approach the restraining device;
a sound indicating that the animal is moving in a wrong direction;
a vibration from the restraining device located on the livestock animal; and
an electric shock.

17. A method of managing livestock comprising:
a. providing a system for management of a plurality of livestock animals in a group, the system comprising:
  i. a plurality of devices for restraining livestock animals, each device having at least one open configuration and at least one closed configuration and comprising:
    at least one opening configured to allow passage of an upper part of a body of a livestock animal when the device is in the open configuration;
    a locking mechanism having a locked state and an unlocked state, wherein the locking mechanism is configured to switch the device from the open configuration to the closed configuration and from the closed configuration to the open configuration, wherein the locking mechanism comprises an electromagnetic or electromechanical device configured to switch the device via an axis;
    at least one animal identification element configured to identify individual livestock animals;
    at least one controller in communication with the animal identification element and the locking mechanism;
    at least one local computer comprising data storage, in communication with the controller and the animal identification element; and
    at least one signaling element, in communication with the controller, the signaling element configured to generate a sensory output recognizable by the livestock animal, the sensory output associated with a stimulus and signaling the livestock animal to implement a predefined action;
  ii. a centralized operation center comprising a data storage, processor and a main controller, in communication with the plurality of devices; and
  iii. a user interface;
b. generating animal-specific sensory outputs by the signaling element, to direct identified individual livestock animals to approach specific devices for controlled feeding access;
c. identifying individual livestock animals using the animal identification element;
d. automatically controlling access of individual livestock animals to feeding areas by selectively switching the locking mechanism between locked and unlocked states based on animal identification data and individual animal feeding data stored in the computer;
e. collecting animal-related data; and f. managing activity of individual livestock animals based on the collected data.

\* \* \* \* \*